(12) United States Patent
Wang et al.

(10) Patent No.: US 12,314,743 B2
(45) Date of Patent: May 27, 2025

(54) DIGITAL ASSISTANT INTERACTION

(71) Applicant: Beijing Zitiao Network Technology Co., Ltd., Beijing (CN)

(72) Inventors: Linlin Wang, Beijing (CN); Chao Han, Beijing (CN)

(73) Assignee: Beijing Zitiao Network Technology Co., Ltd.

( * ) Notice: Subject to any disclaimer, the term of this patent is extended or adjusted under 35 U.S.C. 154(b) by 0 days.

(21) Appl. No.: 18/634,730

(22) Filed: Apr. 12, 2024

(65) Prior Publication Data

US 2025/0138851 A1    May 1, 2025

(30) Foreign Application Priority Data

Oct. 31, 2023    (CN) .......................... 202311437910.1

(51) Int. Cl.
*G06F 9/44*        (2018.01)
*G06F 9/451*       (2018.01)

(52) U.S. Cl.
CPC .................................... *G06F 9/453* (2018.02)

(58) Field of Classification Search
CPC ....................................................... G06F 9/543
USPC .......................................................... 719/310
See application file for complete search history.

(56) References Cited

U.S. PATENT DOCUMENTS

| 2013/0111348 A1* | 5/2013 | Gruber ................ H04M 1/6091 715/727 |
| 2018/0330720 A1 | 11/2018 | Lu et al. |
| 2022/0310079 A1 | 9/2022 | Kalns et al. |

FOREIGN PATENT DOCUMENTS

| CN | 105094315 | 11/2015 |
| CN | 106774832 | 5/2017 |
| CN | 111159380 | 5/2020 |
| CN | 111353017 | 6/2020 |
| CN | 113014853 | 6/2021 |
| CN | 114003702 | 2/2022 |

(Continued)

OTHER PUBLICATIONS

International Search Report and Written Opinion in International Appln. No. PCT/CN2024/080416, mailed on Jun. 29, 2024, 9 pages (with English translation).

(Continued)

*Primary Examiner* — Timothy A Mudrick
(74) *Attorney, Agent, or Firm* — Fish & Richardson P.C.

(57) ABSTRACT

Embodiments of this specification describe technologies for interaction with a digital assistant. One method comprises: based on a storage configuration of the digital assistant, determining whether interaction information between a user and the digital assistant comprises one of: information corresponding to a first type or information depending on the first type of information indicated by the storage configuration; in response to the interaction information comprising the first type of information and the first type of information being not stored, writing the first type of information into a storage area; in response to the interaction information comprising information depending on the first type of information and the first type of information having been stored, reading the stored first type of information from the storage area; and determining, based on the stored or read first type of information, a response of the digital assistant to the user.

17 Claims, 5 Drawing Sheets

(56) References Cited

FOREIGN PATENT DOCUMENTS

CN 116821309 9/2023

OTHER PUBLICATIONS

Extended European Search Report in European Appln No. 24720403.5, dated Apr. 9, 2025, 10 pages.

* cited by examiner

DIGITAL ASSISTANT INTERACTION

CROSS-REFERENCE TO RELATED APPLICATIONS

This application claims priority to Chinese Patent Application No. 202311437910.1, filed on Oct. 31, 2023, and entitled "METHOD, APPARATUS, DEVICE AND STORAGE MEDIUM FOR DIGITAL ASSISTANT INTERACTION", the entirety of which is incorporated here by reference.

TECHNICAL FIELD

The example embodiments of the present specification relate generally to the field of computers, and, more particularly, to digital assistant interaction.

BACKGROUND

Digital assistants are provided to assist users in various task processing needs in different applications and scenarios. Digital assistants usually have intelligent dialogue and task processing capabilities. In the process of the interaction with digital assistants, users input interactive messages, and digital assistants respond to user input to provide response messages. Typically, digital assistants can support user inputs providing questions in a natural language and perform tasks and provide responses based on the understanding of the natural language input and logical reasoning ability of the digital assistants. Digital assistant interaction has become a useful tool that people love and rely on due to its flexible and convenient characteristics.

SUMMARY

In a first aspect of the present disclosure, a method for interaction with a digital assistant is provided. The method comprising: determining, based on a storage configuration of the digital assistant, whether interaction information between a user and the digital assistant comprises one of: information corresponding to a first type of information or information depending on the first type of information, wherein the first type of information is indicated by the storage configuration; in response to determining that the interaction information comprises information corresponding to the first type of information and the first type of information is not stored, writing the first type of information into a storage area corresponding to the first type; in response to determining that the interaction information comprises information depending on the first type of information and the first type of information has been stored, reading the stored first type of information from the storage area corresponding to the first type; and determining, based on the stored or read first type of information, a response of the digital assistant to the user.

In a second aspect of the present disclosure, an apparatus for interaction with a digital assistant is provided. The apparatus includes: an information determination module configured to determine, based on a storage configuration of a digital assistant, whether interaction information between a user and the digital assistant comprises one of: information corresponding to a first type of information or information depending on the first type of information, wherein the first type of information is indicated by the storage configuration; an information writing module configured to write, in response to determining that the interaction information comprises information corresponding to the first type of information and the first type of information is not stored, the first type of information into a storage area corresponding to the first type; an information reading module configured to read, in response to determining that the interaction information comprises information depending on the first type of information and the first type of information has been stored, the stored first type of information from the storage area corresponding to the first type; and a response determination module configured to determine, based on the stored or read first type of information, a response of the digital assistant to the user.

In a third aspect of the present disclosure, an electronic device is provided. The device comprises: at least one processing unit; and at least one memory, the at least one memory being coupled to the at least one processing unit and storing instructions for execution by the at least one processing unit. The instructions, when executed by at least one processing unit, cause the electronic device to perform the method of the first aspect.

In the fourth aspect of the present disclosure, there is provided a computer-readable storage medium. The medium stores a computer program which, when executed by a processor, causes the device to implement the method of the first aspect.

The subject matter described in this specification can be implemented in particular embodiments so as to realize one or more of the following advantages.

By providing the digital assistant with persistent storage configuration to indicate one or more types of information, during the interaction between the user and the digital assistant, specific types of information can be persistently read and stored for use as an interaction context to determine the response to the user for the interaction between the digital assistant and the user. As such, from the perspective of the user interacting with the digital assistant, the digital assistant can remember certain key information, thereby improving the accuracy and pertinence of the responses of the digital assistant. In some embodiments, the latest information provided by the user can be continuously updated and recorded as the interaction progresses, which is used to implement the following interaction of the digital assistant.

It would be appreciated that the content described in the section is neither intended to identify the key features or essential features of the present disclosure, nor is it intended to limit the scope of the present disclosure. Other features of the present disclosure will be readily understood through the following description.

BRIEF DESCRIPTION OF THE DRAWINGS

The above and other features, advantages and aspects of the various embodiments of the present disclosure will become more apparent in combination with the accompanying drawings and with reference to the following detailed description. In the drawings, the same or similar reference symbols refer to the same or similar elements, wherein.

DETAILED DESCRIPTION

Figure 1:
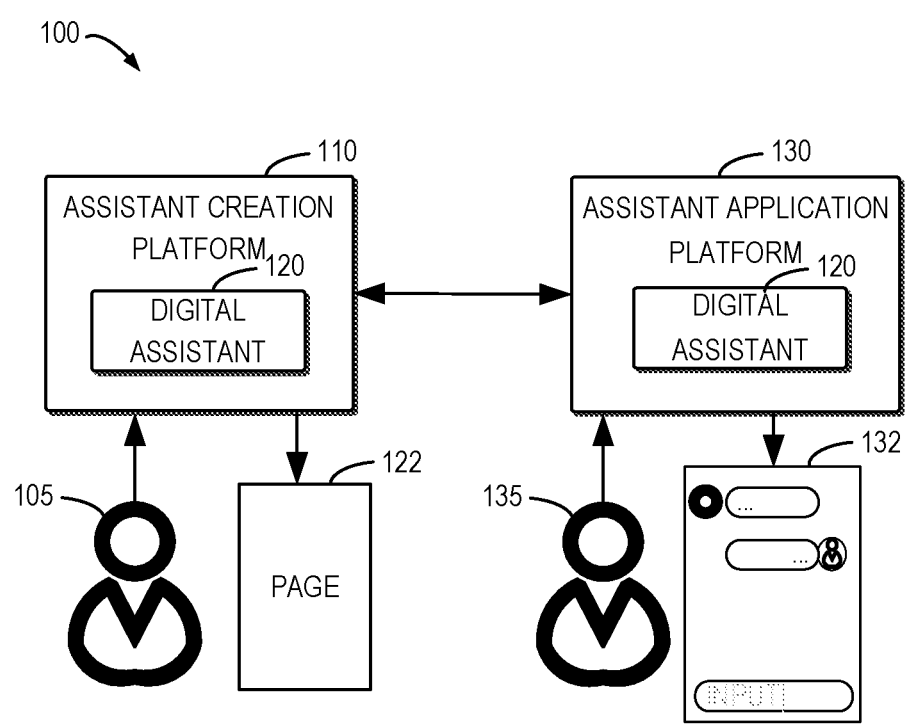
FIG. 1 shows a schematic diagram of an example environment.

The embodiments of the present disclosure will be described in more detail below with reference to the accompanying drawings. Although certain embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the accompanying drawings and embodiments of the present disclosure are only for the purpose of illustration and are not intended to limit the scope of protection of the present disclosure.

In the description of the embodiments of the present disclosure, the term "including" and similar terms would be appreciated as open inclusion, that is, "including but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below.

Unless expressly stated herein, performing a step "in response to A" does not mean that the step is performed immediately after "A", but may include one or more intermediate steps.

It will be appreciated that the data involved in this technical solution (including but not limited to the data itself, data acquisition or use) shall comply with the requirements of corresponding laws, regulations and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, wherein the relevant user may include any type of rights subject, such as individuals, enterprises, groups.

For example, in response to receiving an active request from a user, a prompt message is sent to the user to explicitly prompt the user that the operation requested operation by the user will need to obtain and use the user's personal information, so that users may select whether to provide personal information to the software or the hardware such as an electronic device, an application, a server or a storage medium that perform the operation of the technical solution of the present disclosure according to the prompt information.

As an optional but non-restrictive implementation, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

As used herein, the term "model" can learn a correlation between respective inputs and outputs from training data, so that a corresponding output can be generated for a given input after training is completed. The generation of the model can be based on machine learning techniques. Deep learning is a machine learning algorithm that processes inputs and provides corresponding outputs by using multiple layers of processing units. A neural networks model is an example of a deep learning-based model. As used in this specification, "model" may also be referred to as "machine learning model", "learning model", "machine learning network", or "learning network", and these terms are used interchangeably.

Digital assistants can serve as effective tools for people's work, study, and life. In general, the development of digital assistants is similar to the development of general applications, requiring developers having programming skills to define the various capabilities of digital assistants by writing complex code, and deploying digital assistants on appropriate operating platforms so that users can download, install, and use digital assistants. With the diversification of application scenarios and the increasing availability of machine learning technology, digital assistants with different capabilities have been developed to support task processing in various segmented fields or meet the personalized needs of different users.

FIG. 1 shows a schematic diagram of an example environment 100 in which embodiments of the present disclosure can be implemented. The environment 100 involves an assistant creation platform 110 and an assistant application platform 130.

As shown in FIG. 1, the assistant creation platform 110 can provide a creation and publication environment of a digital assistant for a user 105. In some embodiments, the assistant creation platform 110 can be a low-code platform that provides a collection of tools of digital assistant creation. The assistant creation platform 110 can support visual development for digital assistants, thereby allowing developers to skip the manual coding process and accelerate the development cycle and cost of applications. The assistant creation platform 110 can support any suitable platform for users to develop digital assistants and other types of applications, for example, it can include platforms based on application platform as a service (aPaaS). Such a platform can support users to efficiently develop applications, achieve application creation, application function adjustment, and other operations.

The assistant creation platform 110 can be deployed locally on the terminal device of the user 105 and/or can be supported by a remote server. For example, the terminal device of the user 105 can run a client (e.g., an application) in communication with the assistant creation platform 110, which can support the user's interaction with the assistant creation platform 110. In the case where the assistant creation platform 110 is run locally on the user's terminal device, the user 105 can directly use the client to interact with the local assistant creation platform 110. In the case where the assistant creation platform 110 is run on a server level device, the server-side device can implement the provision of services to the client running on the terminal device based on the communication connection between the terminal device. The assistant creation platform 110 can present a corresponding page 122 (e.g., an interface 300 of FIG. 3 as will be described below) to the user 105 based on the operation of the user 105 to output and/or receive information from the user 105.

In some embodiments, the assistant creation platform 110 may be associated with a corresponding database, which stores data or information required for the digital assistant creation process supported by the assistant creation platform 110. For example, the database may store code and descriptive information corresponding to various functional modules that make up the digital assistant. The assistant creation platform 110 may also perform operations such as calling, adding, deleting, updating, etc. on the functional modules in the database. The database may also store operations that can be performed on different functional blocks. For example, in a scenario where a digital assistant is to be created, the assistant creation platform 110 may call corresponding functional blocks from the database to build the digital assistant.

In some embodiments of the present disclosure, the user 105 may create a digital assistant 120 on the assistant creation platform 110 as needed, and publish the digital assistant 120. The digital assistant 120 may be published to any suitable assistant application platform 130, as long as the assistant application platform 130 can support the execution of the digital assistant 120. After publishing, the digital assistant 120 may be used for conversational interaction with a user 135. A client of the assistant application platform 130 may present an interaction window 132 of the digital assistant 120 in the client interface, such as the conversation window. For example, the assistant application platform 130 may execute an application that generates the interaction window 132 for presentation to the user 135. The digital assistant 120, as an intelligent assistant, has intelligent conversation and information processing capabilities. The user 135 may enter a conversation message in the conversation window, and the digital assistant 120 may determine a reply message based on the configuration information used in creating the digital assistant 120 and present the reply message to the user in the interaction window 132. In some embodiments, depending on the configuration of the digital assistant 120, the interaction messages with the digital assistant 120 may include messages in various formats, such as text messages (e.g., natural language text), voice messages, image messages, video messages, and so on.

The user 105 who creates the digital assistant may sometimes be referred to as the assistant creator, assistant developer, etc. The user 135 who interacts with the created digital assistant is sometimes also referred to as the user of the digital assistant, user, etc.

The assistant creation platform 110 and/or the assistant application platform 130 may run on an appropriate electronic device. The electronic device herein may be any type of computing-capable device, including a terminal device or a server-side device. The terminal device may be any type of mobile terminal device, fixed terminal device, or portable terminal device, including mobile phones, desktop computers, laptop computers, notebook computers, netbook computers, tablet computers, media computers, multimedia tablets, personal communication system (PCS) devices, personal navigation devices, personal digital assistants (PDAs), audio/mobile player, digital cameras/video cameras, positioning devices, television receivers, radio broadcast receivers, e-book devices, gaming devices, or any combination thereof, including accessories and peripherals of these devices, or any combination thereof. Server-side devices may include, for example, computing systems/ servers, such as mainframes, edge computing nodes, computing devices in cloud environments, and so on. In some embodiments, the assistant creation platform 110 and/or the assistant application platform 130 may be implemented based on cloud service.

The digital assistant creation process can be implemented on the assistant creation platform, with the terminal device installed on the assistant creation platform and/or the server-side corresponding to the assistant creation platform. In the examples below, for the purpose of discussion, the creation process can be described from the perspective of the assistant creation platform, such as the assistant creation platform 110 shown in FIG. 1. The page presented by the assistant creation platform 110 can be presented via the terminal device of the user 105, and user input can be received via the terminal device of the user 105.

It will be appreciated that the structure and function of the environment 100 is described for the purposes of illustration only, without implying any limitation on the scope of the present disclosure. For example, although FIG. 1 shows a single user interacting with the assistant creation platform 110 and a single user interacting with the assistant application platform 130, multiple users can actually access the assistant creation platform 110 to create a digital assistant respectively, and each digital assistant can be used to interact with multiple users.

In general, in the process of the interaction between users and digital assistants, due to limitations such as model input length, digital assistants will at most extract limited contextual information from historical interactions to understand user input. However, for users interacting with digital assistants, they may expect digital assistants to maintain long-term memory for certain information, and thereby continuously provide more targeted responses. In accordance with the interaction process with the digital assistant, if the digital assistant needs to repeatedly inquire about this information, it will cause a decrease in user experience.

According to embodiments of the present disclosure, an improved solution for creating a digital assistant is provided. According to this solution, a digital assistant is provided with a persistent storage configuration to indicate one or more types of information. During the interaction between a user and the digital assistant, the digital assistant determines whether the interaction information is associated with a certain type of information indicated by the persistent storage configuration. In response to a determination that the interaction information comprises a first type of information and the first type of information is not stored, the first type of information is written into a storage area corresponding to the first type. In response to a determination that the interaction information depends on the first type of information and the first type of information has been stored, the stored first type of information is read from the storage area corresponding to the first type. A response of the digital assistant to the user is determined based on the stored or read first type of information.

In this way, during the interaction between the user and the digital assistant, specific types of information can be persistently read and stored for use as an interaction context to determine the response to the user for the interaction between the digital assistant and the user. As such, from the perspective of the user interacting with the digital assistant, the digital assistant can remember certain key information, thereby providing a good interaction experience. This can also improve the accuracy and pertinence of the responses of the digital assistant and enhances the interaction experience.

In the following, some example embodiments of the present disclosure will be described in detail with reference to the accompanying drawings. It should be understood that the pages shown in the drawings are merely examples and various page designs may actually exist. The various graphic elements in the page may have different arrangements and visual representations, one or more of which may be omitted or updated, and one or more other elements may also exist.

Figure 2:
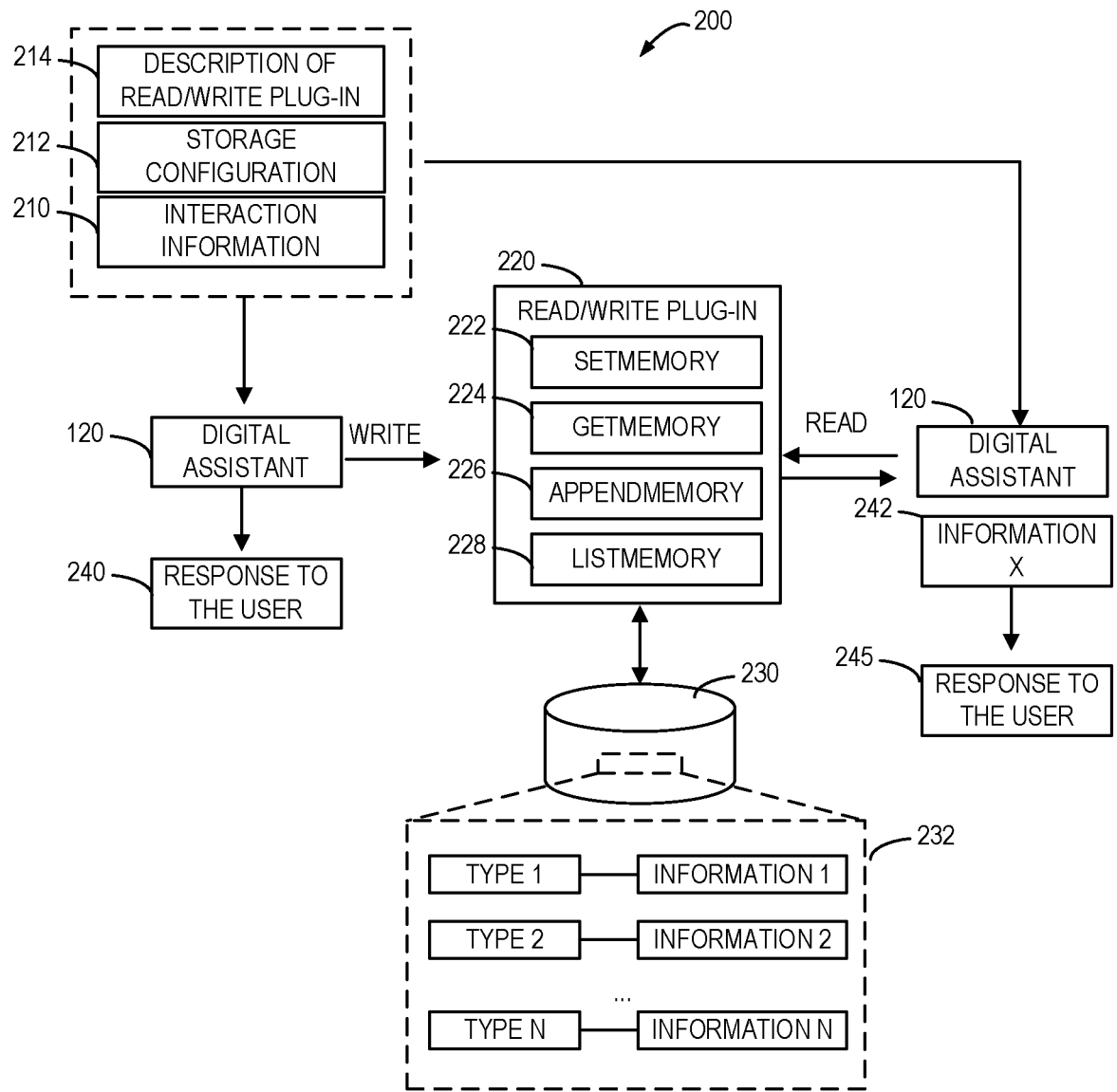
FIG. 2 shows a flowchart of an example process for digital assistant interaction.

FIG. 2 shows a flowchart of an example process 200 for digital assistant interaction according to some embodiments of the present disclosure. For case of discussion, the process 200 will be described with reference to the environment 100 of FIG. 1. The process 200 involves the application stage of the digital assistant 120 after creation, therefore can be implemented on an assistant application platform, e.g., the assistant application platform 130. It would be appreciated that the operations described below with respect to the assistant application platform 130 and/or the digital assistant 120 can be performed by terminal devices and/or servers running the assistant application platform 130 and/or the digital assistant 120, or can be understood as being performed by applications corresponding to the application assistant platform 130 and/or the digital assistant 120.

The digital assistant 120 is used to interact with users (e.g., the user 135). As shown in FIG. 2, during the interaction between the user 135 and the digital assistant 120, the assistant application platform 130 can determine whether an interaction information 210 between the user 135 and the digital assistant 120 includes or depends on one or more types of information indicated by the persistent storage configuration based on a storage configuration 212 of the digital assistant 120. The persistent storage configuration indicates one or more types of information to be stored for the digital assistant 120, and may include definitions of one or more types of information to be stored for the digital assistant 120. During the interaction between the user 135 and the digital assistant 120, according to the storage configuration 212, the digital assistant 120 will store, update, and/or query and read one or more types of information indicated, and interact with the user 135 based on these types of information to determine a response to the user.

In some embodiments, the digital assistant 120 can apply a model to assist in interaction with users. The digital assistant 120 can apply the model to understand a user input and provide a response to the user based on the output of the model. The model used by the digital assistant 120 may be run locally on the assistant creation platform 110 or on a remote server. In some embodiments, the model can be a machine learning model, a deep learning model, a learning model, neural networks, etc. In some embodiments, the model can be based on a language model (LM). The language model can have question-answering capabilities by learning from a large scale of corpus. This model can also be based on other appropriate models.

During the interaction between the user and the digital assistant 120, and due to limitations of the length of the model input and other reasons, the digital assistant will extract limited contextual information from historical interactions to understand user input. However, for users interacting with the digital assistant, they may expect the digital assistant to maintain long-term memory of certain information, so that the digital assistant can continuously provide more targeted responses. In response to the process of the interaction with the digital assistant, if the digital assistant needs to repeatedly inquire about this information, it will cause a decrease in the user experience. Therefore, in embodiments of the present disclosure, the digital assistant 120 will be configured with at least one type of information to be stored. Through this storage configuration, the defined at least one type of information will be automatically extracted and stored for subsequent interaction between the digital assistant 120 and the user. If the user updates a certain type of information during the interaction, the previously stored information of this type will be overwritten or updated. These defined types of information will be stored for a specific user interacting with the digital assistant 120 for a long time. Such storage configuration for the digital assistant is also called persistent storage configuration. In this way, from the perspective of the interactive user of the digital assistant 120, the digital assistant 120 can always remember certain pieces of information associated with specified types, thereby obtaining a good interaction experience.

Figure 3:
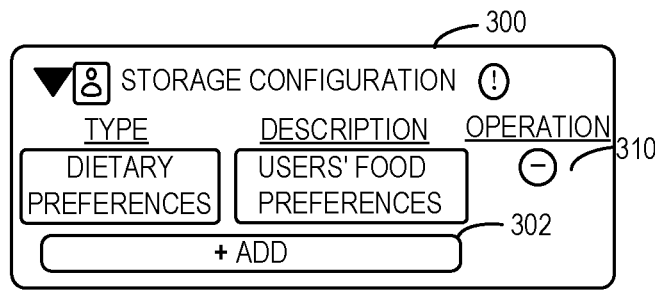
FIG. 3 shows a schematic diagram of an example storage configuration of creating a digital assistant.

FIG. 3 shows a schematic diagram of an example storage configuration for creating the digital assistant 120 according to some embodiments of the present disclosure. An interface 300 of FIG. 3 can be understood as part of the creation page of the digital assistant 120. In the interface 300, the creator of the digital assistant 120 can configure the storage configuration of the digital assistant 120. The creator of the digital assistant 120 can add the type name and description of the information to be stored in the interface 300. In the example of FIG. 3, it is assumed that the "dietary preferences" of the configured type needs to record the user's preferences for food. In addition, the creator can delete the information of a type that has been added by deleting a control 310, or add more types of information by adding a control 302. In some embodiments, the storage configuration can define the type of information to be stored in a one-to-one form of Attribute-Value Pair (key-value), with "key" information indicating the type of information to be stored and "value" indicating the specific information under that type. In some embodiments, more complex structured data can also be defined in the storage configuration. For example, a one-to-many data structure can be defined, to store a plurality of information values for a certain type. Alternatively, a many-to-many data structure can be defined to store a plurality of information values for a plurality of types. The format of the information to be stored for a long time is not specifically limited here.

In addition to defining the storage configuration 212 of the digital assistant 120 by the creator of the digital assistant 120 during the creation phase, in some embodiments, optionally, the storage configuration 212 of the digital assistant 120 can be customized during the application phase between the user 135 and the digital assistant 120. The embodiments of the present disclosure are not limited here.

After the storage configuration 212 of the digital assistant 120 is defined, as described above, during the interaction between the digital assistant 120 and the user 135, the digital assistant can determine whether the interaction information 210 of each interaction includes or depends on one or more types of information indicated by the storage configuration 212. The interaction information 210 used in the determination may include one or more session messages (also known as "user queries") input by the user 135 to the digital assistant 120, and/or one or more rounds of session messages including the user 135 and the digital assistant 120. The digital assistant 120 has the capability to extract interaction information in combination with the session context.

In some embodiments, the digital assistant 120 can determine whether some or all of the information of the interaction information 210 matches the name of one or more types indicated by the storage configuration 212. For example, the name of one or more types indicated by the storage configuration 212 may be defined as a "keyword", and then by matching the keyword of the interaction information 210, it is determined whether the interaction information 210 can match the name of one or more types indicated by the storage configuration 212.

In some embodiments, the interaction information 210 includes one or more types of information indicated by one or more types in the storage configuration 212, which means that the interaction information 210 gives specific information associated with particular types of the one or more types. For example, in response to the storage configuration indicating to store information of the type "dietary preferences" of the user which is associated with one of more keywords such as "hot pot", "sushi," or "Mexican cuisine," when the user's interaction information includes information such as "I like hot pot", it can determine through the keyword matching that the interaction information includes information of the type "dietary preferences" indicated by the storage configuration 212.

The responses to the interaction information 210 can depend on one or more types of information indicated by the storage configuration 212, which means that the responses of the digital assistant 120 to the interaction information 210 may need to be determined based on the information stored for the one or more types of information. For example, if the interaction information entered by the user is: "Please recommend some restaurants for me.", when determining a response to the user, the digital assistant may need to use information related to the type "dietary preferences" of the user in order to provide a more accurate response.

In some embodiments, the digital assistant 120 may use a machine learning model to determine whether the interaction information 210 includes or depends on one or more types of information indicated by the storage configuration 212. Specifically, a prompt input for the model may be constructed based on the storage configuration 212 and the interaction information 210. The prompt input is used to guide the model to determine whether the interaction information 210 is associated with one or more types indicated by the storage configuration 212. The prompt input may include, for example, a system prompt for the model. The prompt input is provided to the model to obtain the output of the model. The output of the model indicates a prediction of whether the interaction information 210 includes, depends on, or is otherwise associated with one or more types of information indicated by the persistent storage configuration.

If the interaction information 210 includes the first type of information and the first type of information is not stored, the assistant application platform 130 writes the first type of information into the storage area corresponding to the first type. In response to determining that the interaction information 210 depends on the first type of information where the first type of information has previously been stored, the stored first type of information is read from the storage area corresponding to the first type.

Referring back to FIG. 2, in FIG. 2, one or more types of information indicated by the storage configuration can be stored in a storage device 230, and each type of information is assigned a corresponding storage area 232 in the storage device 230 for storing information of each type. As shown in FIG. 2, the different storage areas 232 are used to store "information 1" corresponding to type 1, "information 2" corresponding to type 2, and "information N" corresponding to type N. Depending on the specific interaction between the user 135 and the digital assistant 120, one or more types of information indicated by the storage configuration 212 may have been stored (for example, for type 1 and type N), or may not have been stored (for example, for type 2).

The storage device 230 can be any suitable type of device capable of long-term persistent data storage. The storage device 230 can be any suitable data repository or storage system, such as a remote dictionary server (Redis), etc. The embodiments of the present disclosure are not limited to the specific type of the storage device 230.

In some embodiments, the digital assistant 120 can also be registered with corresponding plug-ins to perform writing and reading of various types of information indicated by the storage configuration 212. Herein, the plug-in is named a "read-write plug-in" 220. The read-write plug-in 220 can be configured with corresponding tools (or functions) for implementing writing and reading of various types of information indicated by the storage configuration 212. In some embodiments, in addition to the storage configuration 212 of the digital assistant and the current interaction information 210, prompt input for the model can also be constructed based on a description 214 of the read-write plug-in this way, prompt input can guide the model to write one or more types of information mentioned in the interaction information 210 to the corresponding storage area or read from the corresponding storage area.

In some embodiments, the read-write plug-in 220 can be configured to one or more functions for implementing writing and reading information. FIG. 2 shows an example function that the read-write plug-in 220 can call. For example, a setMemory function 222 can be configured to set (write) specific types of information, a getMemory function 224 can be configured to obtain (read) specific types of information, an appendMemory function 226 can be configured to write one-to-many types of information, a listmemory function 228 can be configured to write many-to-many types of information, and so on. It will be noted that only some example functions are given here. In practical applications, different functions can be set for the read-write plug-in 220 as needed to achieve reading and writing of information of different data structures.

In some embodiments, the description 214 of the read-write plug-in includes a description of the read-write tasks that the read-write plug-in can perform, an indication of the tools or functions included in the read-write plug-in (e.g., the respective functions 222, 224, 226, and 228 in FIG. 2), a description of the functions that can be implemented by these functions, parameters required for the operation of the functions, etc. In some embodiments, the description 214 of the read-write plug-in can be provided with prompt input for building a model. The construction of such prompt input can be defined during the creation phase of the digital assistant, or it can also be defined during the application phase of the digital assistant.

In this way, by calling the read-write plug-in 220 of the digital assistant 120, one or more types of information indicated in the storage configuration 212 can be written into the corresponding storage area. Alternatively, by calling the read-write plug-in 220 of the digital assistant 120, to read one or more types of information that have been stored from the corresponding storage area.

Further, based on the stored or read information of the first type, the response of the digital assistant 120 to the user 135 is determined. In FIG. 2, in response to determining that the interaction information 210 includes information of the first type, the digital assistant 120 can extract information corresponding to the first type from the interaction information 210 (e.g., with the help of the read-write plug-in 220) and write the extracted information into the storage area 232 corresponding to the persistent storage device 230. Further, the digital assistant 120 can also determine the response 240 of the digital assistant to the user 135 based on the first type of information. In response to determining that the interaction information 210 depends on or is associated with already stored information of the first type, the digital assistant 120 can (e.g., with the help of the read-write plug-in 220) read information 242 corresponding to the first type from the storage area 232 corresponding to the persistent storage device 230. Further, the digital assistant 120 can also determine a response 245 of the digital assistant to the user 135 based on the first type of information.

Figure 4:
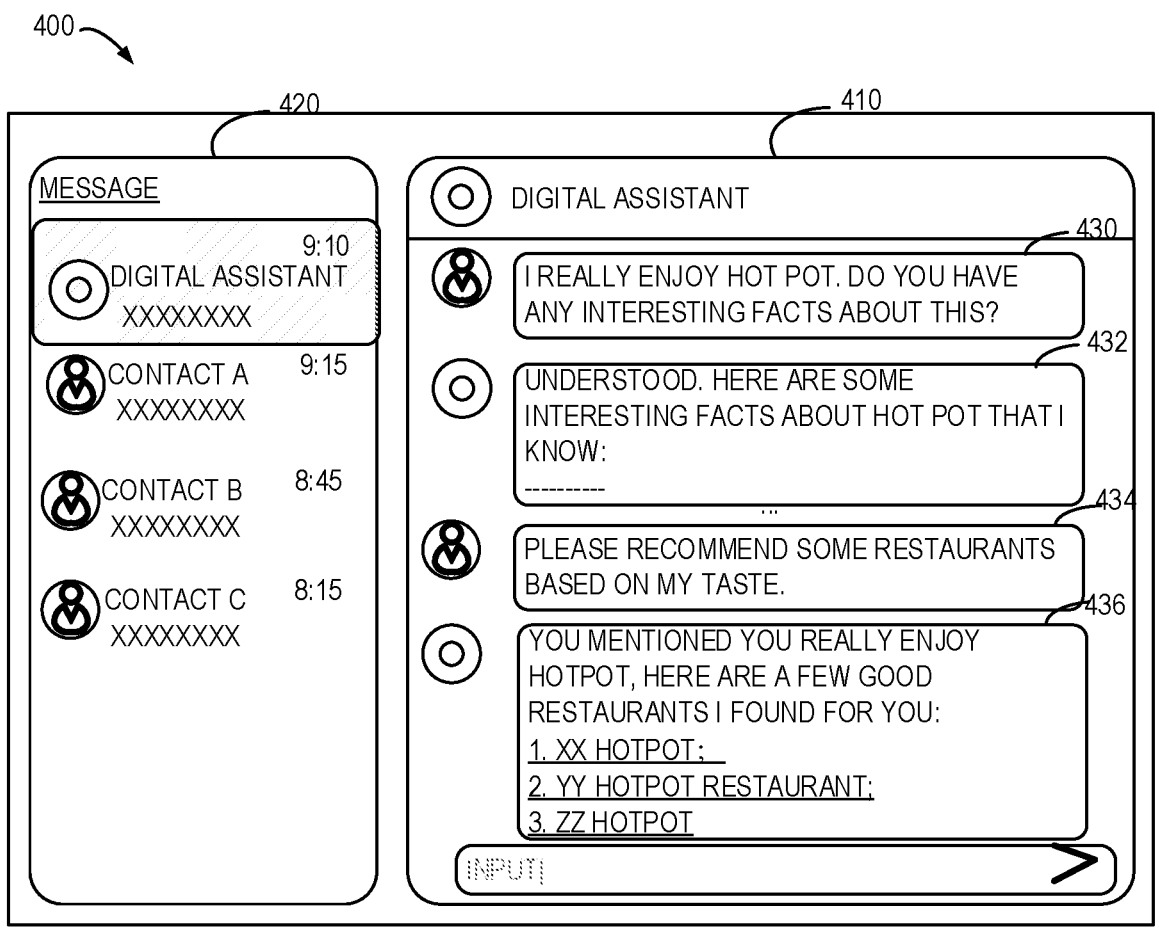
FIG. 4 shows an example of a user interface with a digital assistant.

FIG. 4 shows an example of an interaction interface 400 between the user 135 and the digital assistant 120 in accordance with some embodiments of the present disclosure. In this example, it is assumed that the digital assistant 120 may be evoked to interact with a user in a message interaction application. By selecting the digital assistant 120 in a contact area 420, a session window 410 corresponding to the digital assistant 120 may be presented. The user may enter a session message in the session window 410 and may view the replies of the digital assistant 120 in the session window 410.

In the example of FIG. 4, it is assumed that the persistent storage configuration of the digital assistant 120 indicates at least the type "dietary preferences". In the interaction between the user and the digital assistant 120, the user inputs a session message 430, which matches the type of "dietary preferences" in the persistent storage configuration. In this way, the information "hot pot" corresponding to this type can be extracted from the session message 430 and stored in the storage area of the persistent storage device 230. In addition, in this interaction, the digital assistant 120 will also determine a response message 432 to the user based on the stored information.

In subsequent interactions, the information "hot pot" corresponding to this type is persistently stored and can be read and used by the digital assistant 120 at any time, without being forgotten as the interaction passes. In a subsequent interaction, the user continues to input a session message 434, which also matches the type of "dietary preferences" previously stored in the persistent storage configuration. At this time, since the information "hot pot" corresponding to this type has been previously stored, the digital assistant 120 can read the information of this type from the corresponding storage area and determine a response message 436 to the user based on this information.

In some embodiments, if a certain type of information in the persistent storage configuration is provided again in the interaction between the user 135 and the digital assistant 120, then the previously stored information of that type may be updated. For example, if it is determined that the interaction information between the user 135 and the digital assistant 120 includes the first type of information, but the stored the first type of information is different from the information in the current interaction information, then the stored information can be updated to add the information of the first type included in the interaction information 210. Therefore, the latest information provided by the user 135 can be continuously updated and recorded as the interaction progresses, which is used to implement the interaction of the digital assistant.

In some embodiments, in response to determining that the interaction information 210 depends on the first type of information and the first type of information is not stored, the digital assistant can provide a prompt to the user 135 to prompt the user 135 to provide the first type of information. In this way, the user can be prompted to actively provide the required information to improve the accuracy of the interaction. For example, in the interaction example of FIG. 4, assuming that the user has not provided the session message 430, but directly asked for a recommendation about the restaurant in the session message 434, then the response message of the digital assistant 120 can prompt the user to first provide information about the type of "dietary preferences" in order to complete the restaurant recommendation expected by the user. After the user provides information about the type of "dietary preferences" based on the prompt information, the digital assistant 120 can not only record the information under the corresponding type, but also complete the restaurant recommendation based on the obtained information.

Figure 5:
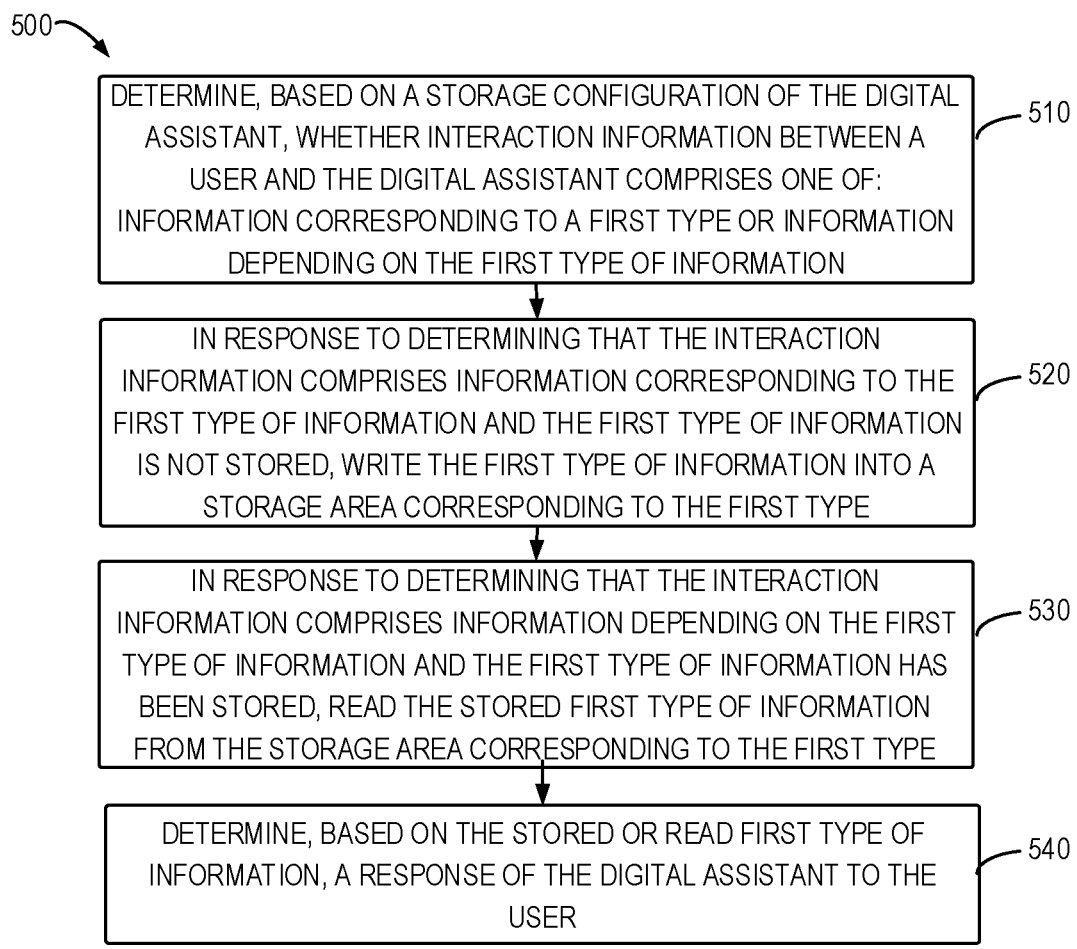
FIG. 5 shows a flowchart of an example process for digital assistant interaction.

FIG. 5 shows a flowchart of an example process 500 for digital assistant interaction in accordance with some embodiments of the present disclosure. The process 500 may be implemented at the assistant application platform 130. The process 500 will be described below with the reference to FIG. 1.

At block 510, the assistant application platform 130 determines, based on a storage configuration of the digital assistant, whether interaction information between a user and the digital assistant comprises one of: information corresponding to a first type of information or information depending on the first type of information, wherein the first type of information is indicated by the storage configuration.

At block 520, the assistant application platform 130 writes the first type of information into a storage area corresponding to the first type, in response to determining that the interaction information comprises information corresponding to the first type of information and the first type of information is not stored.

At block 530, the assistant application platform 130 reads the stored first type of information from the storage area corresponding to the first type, in response to a determination that the interaction information comprises information depending on the first type of information and the first type of information has been stored.

At block 540, the assistant application platform 130 determines, based on the stored or read first type of information, a response of the digital assistant to the user.

In some embodiments, the storage configuration includes a definition of one or more types of information to be stored for the digital assistant, one or more types including a first type.

In some embodiments, the process 500 further comprises: in response to the first type of information stored in the interaction information being different from the first type of information included, updating the stored information of the first type with the information included in the interaction information.

In some embodiments, the process 500 further comprises: in response to determining that the interaction information depends on the first type of information and that the first type of information is not stored, providing a prompt for information to the user, the prompt requesting that the user to provide the first type of information.

In some embodiments, determining whether the interaction information one of: information corresponding to the first type or information depending on the first type of information comprises: constructing a prompt input for a machine learning model based on the storage configuration and interaction information; and by providing the prompt input to the machine learning model, obtaining an output of the machine learning model, the machine learning model output indicating whether the interaction information includes or depends on the first type of information indicated by the storage configuration.

In some embodiments, the storage area corresponding to the first type includes a storage area of a persistent storage device.

In some embodiments, writing the first type of information into the storage area corresponding to the first type comprises: by calling the read and write plug-in of the digital assistant, writing the first type of information into the storage area corresponding to the first type.

In some embodiments, reading the stored first type of information from the storage area corresponding to the first type comprises: by calling the read and write plug-in of the digital assistant, reading the stored first type of information from the storage area corresponding to the first type.

Figure 6:
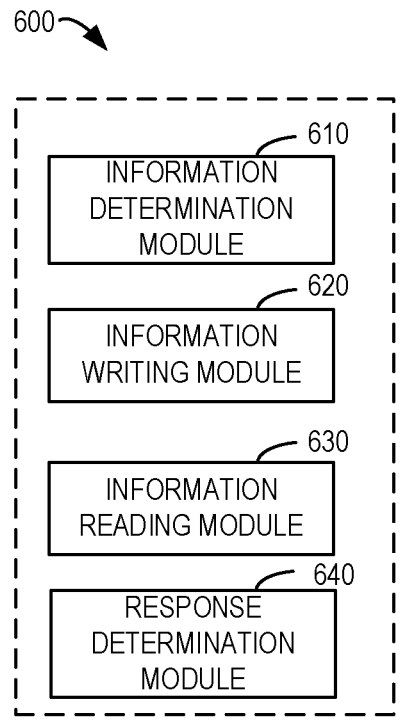
FIG. 6 shows a block diagram of an example apparatus for digital assistant interaction.

FIG. 6 shows a block diagram of an example apparatus 600 for digital assistant interaction in accordance with some embodiments of the disclosure. The apparatus 600 may be implemented or included, for example, in the assistant application platform 130. The various modules/components in the apparatus 600 may be implemented by hardware, software, firmware, or any suitable combination thereof.

As shown in FIG. 6, the apparatus 600 comprises an information determination module 610, which is configured to determine, based on a storage configuration of the digital assistant, whether interaction information between a user and the digital assistant one of: information corresponding to a first type or information depending on the first type of information, wherein the first type of information is indicated by the storage configuration. The apparatus 600 also comprises an information writing module 620, which is configured to write, in response to a determination that the interaction information comprises information corresponding to the first type of information and the first type of information is not stored, the first type of information into a storage area corresponding to the first type.

The apparatus 600 further comprises an information reading module 630 configured to read, in response to a determination that the interaction information comprises information depending on the first type of information and the first type of information has been stored, the stored first type of information from the storage area corresponding to the first type.

In some embodiments, the storage configuration comprises a definition of one or more types of information to be stored for the digital assistant, one or more types including a first type.

In some embodiments, the apparatus 600 further includes an information updating module, configured to: in response to the stored first type of information being different from the first type of information included in the interaction information, update the stored information of the first type with the information included in the interaction information.

In some embodiments, the apparatus 600 further includes an information prompting module, configured to: in response to determining that the interaction information depends on the first type of information and that the first type of information is not stored, provide a prompt for information to the user, the prompt requesting that the user to provide the first type of information.

In some embodiments, the information determination module 610 includes: a prompt building module configured to construct a prompt input for a machine learning model based on the storage configuration and interaction information; and an output obtaining module configured to provide the prompt input to the machine learning model, to obtain an output of the machine learning model, the output of the machine learning model indicating whether the interaction information includes or depends on the first type of information indicated by the storage configuration.

In some embodiments, the storage area corresponding to the first type includes a storage area of a persistent storage device.

In some embodiments, the information writing module 620 is configured to: read and write plug-ins by calling the digital assistant to write the first type of information corresponding to the first type of storage area.

In some embodiments, the information reading module 630 is configured to: read the first type of information stored from the storage area corresponding to the first type by calling the digital assistant plug-in.

Figure 7:
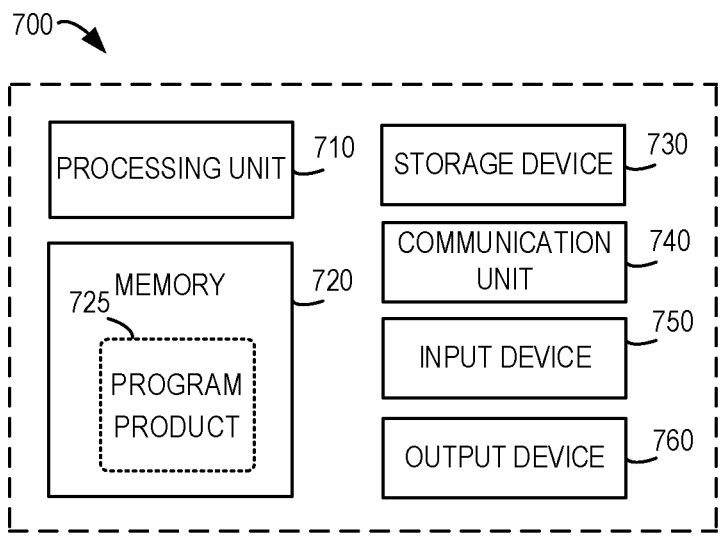
FIG. 7 shows a block diagram of an example electronic device.

FIG. 7 shows a block diagram of an electronic device 700 in which one or more embodiments of the present disclosure may be implemented. It would be appreciated that the electronic device 700 shown in FIG. 7 is only an example and should not constitute any restriction on the function and scope of the embodiments described herein. The electronic device 700 shown in FIG. 7 may include or be implemented as the assistant creation platform 110 and/or the assistant application platform 130 of FIG. 1, and/or the apparatus 600 of FIG. 6.

As shown in FIG. 7, the electronic device 700 is in the form of a general electronic device. The components of the electronic device 700 may include, but are not limited to, one or more processors or processing units 710, a memory 720, a storage device 730, one or more communication units 740, one or more input devices 750, and one or more output devices 760. The processing units 710 may be actual or virtual processors and can execute various processes according to the programs stored in the memory 720. In a multi-processor system, multiple processing units execute computer executable instructions in parallel to improve the parallel processing capability of the electronic device 700.

The electronic device 700 typically includes a variety of computer storage media. Such media can be any available media that is accessible to the electronic device 700, including but not limited to volatile and non-volatile media, removable and non-removable media. The memory 720 can be volatile memory (such as registers, caches, random access memory (RAM)), nonvolatile memory (such as a read-only memory (ROM), an electrically erasable programmable read-only memory (EEPROM), a flash memory), or some combination thereof. The storage device 730 can be any removable or non-removable medium, and can include machine-readable medium, such as a flash drive, a disk, or any other medium which can be used to store information and/or data and can be accessed within the electronic device 700.

The electronic device 700 may further include additional removable/non-removable, volatile/non-volatile storage medium. Although not shown in FIG. 7, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 720 can include a computer program product 725, which comprises one or more program modules configured to execute various methods or actions of the various embodiments disclosed herein.

The communication unit 740 implements communication with other electronic devices via a communication medium. In addition, functions of components in the electronic device 700 may be implemented by a single computing cluster or multiple computing machines, which can communicate through a communication connection. Therefore, the electronic device 700 may be operated in a networking environment using a logical connection with one or more other servers, a network personal computer (PC), or another network node.

The input device 750 may be one or more input devices, such as a mouse, a keyboard, a trackball, etc. The output device 760 may be one or more output devices, such as a display, a speaker, a printer, etc. The electronic device 700 may also communicate with one or more external devices (not shown) through the communication unit 740 as required. The external device, such as a storage device, a display device, etc., communicate with one or more devices that enable users to interact with the electronic device 700, or communicate with any device (for example, a network card, a modem, etc.) that makes the electronic device 700 communicate with one or more other computing devices. Such communication may be executed via an input/output (I/O) interface (not shown).

According to example implementation of the present disclosure, there is provided a computer-readable storage medium on which a computer-executable instruction or computer program is stored, wherein the computer-executable instructions are executed by a processor to implement the methods described above.

Various aspects of the present disclosure are described herein with reference to the flow chart and/or the block diagram of the method, the device, the apparatus and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description provides a number of examples, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

The invention claimed is:

1. A method for interaction with a digital assistant, comprising:
   determining, based on a persistent storage configuration of the digital assistant, whether interaction information between a user and the digital assistant comprises one of: information corresponding to a first type of information or information depending on the first type of information, wherein the first type of information comprises at least one type indicated by the persistent storage configuration, wherein the determining comprises:
      constructing, based on the persistent storage configuration and the interaction information, a prompt input for a machine learning model, wherein the prompt input is used to determine whether the interaction information comprises or depends on the first type of information; and
      obtaining an output of the machine learning model by providing the prompt input to the machine learning model, the output of the machine learning model indicating whether the interaction information comprises or depends on the first type of information indicated by the persistent storage configuration;
   in response to determining that the interaction information comprises information corresponding to the first type of information and the first type of information is not stored, writing the first type of information into a storage area corresponding to the first type;
   in response to determining that the interaction information comprises information depending on the first type of information and the first type of information has been stored, reading the stored first type of information from the storage area corresponding to the first type; and
   determining, based on the stored or read first type of information, a response of the digital assistant to the user.

2. The method of claim 1, wherein the persistent storage configuration comprises a definition of one or more types of information to be stored for the digital assistant, the one or more type comprising the first type.

3. The method of claim 1, further comprising:
in response to determining that the first type of stored information is different from the first type of information included in the interaction information, updating the stored information of the first type with the information included in the interaction information.

4. The method of claim 1, further comprising:
in response to determining that the interaction information depends on the first type of information and that the first type of information is not stored, providing a prompt for information to the user, the prompt requesting that the user to provide the first type of information.

5. The method of claim 1, wherein the storage area corresponding to the first type comprises a storage area in a persistent storage device.

6. The method of claim 1, wherein writing the first type of information into a storage area corresponding to the first type comprises:
writing the first type of information into a storage area corresponding to the first type by calling a read/write plug-in of the digital assistant; and
wherein reading the stored first type of information from the storage area corresponding to the first type comprises:
reading the stored first type of information from the storage area corresponding to the first type by calling a read/write plug-in of the digital assistant.

7. An electronic device comprising:
at least one processing unit; and
at least one memory, the at least one memory being coupled to the at least one processing unit and storing instructions for execution by the at least one processing unit, the instructions, when executed by the at least one processing unit, causing the electronic device to perform operations comprising:
determining, based on a persistent storage configuration of a digital assistant, whether interaction information between a user and the digital assistant comprises one of: information corresponding to a first type or information depending on the first type of information, wherein the first type of information comprises at least one type indicated by the persistent storage configuration, wherein the determining comprises:
constructing, based on the persistent storage configuration and the interaction information, a prompt input for a machine learning model, wherein the prompt input is used to determine whether the interaction information comprises or depends on the first type of information; and
obtaining an output of the machine learning model by providing the prompt input to the machine learning model, the output of the machine learning model indicating whether the interaction information comprises or depends on the first type of information indicated by the persistent storage configuration;
in response to determining that the interaction information comprises information corresponding to the first type of information and the first type of information is not stored, writing the first type of information into a storage area corresponding to the first type;
in response to determining that the interaction information comprises information depending on the first type of information and the first type of information has been stored, reading the stored first type of information from the storage area corresponding to the first type; and determining, based on the stored or read first type of information, a response of the digital assistant to the user.

8. The electronic device of claim 7, wherein the persistent storage configuration comprises a definition of one or more types of information to be stored for the digital assistant, the one or more type comprising the first type.

9. The electronic device of claim 7, wherein the operations further comprise:
in response to determining that the first type of stored information is different from the first type of information included in the interaction information, updating the stored information of the first type with the information included in the interaction information.

10. The electronic device of claim 7, wherein the operations further comprise:
in response to determining that the interaction information depends on the first type of information and that the first type of information is not stored, providing a prompt for information to the user, the prompt requesting that the user to provide the first type of information.

11. The electronic device of claim 7, wherein the storage area corresponding to the first type comprises a storage area in a persistent storage device.

12. The electronic device of claim 7, wherein writing the first type of information into a storage area corresponding to the first type comprises:
writing the first type of information into a storage area corresponding to the first type by calling a read/write plug-in of the digital assistant; and
wherein reading the stored first type of information from the storage area corresponding to the first type comprises:
reading the stored first type of information from the storage area corresponding to the first type by calling a read/write plug-in of the digital assistant.

13. A non-transitory computer readable storage medium having a computer program stored thereon which is executable by a processor to perform operations comprising:
determining, based on a persistent storage configuration of a digital assistant, whether interaction information between a user and the digital assistant comprises one of: information corresponding to a first type or information depending on the first type of information, wherein the first type of information comprises at least one type indicated by the persistent storage configuration, wherein the determining comprises:
constructing, based on the persistent storage configuration and the interaction information, a prompt input for a machine learning model, wherein the prompt input is used to determine whether the interaction information comprises or depends on the first type of information; and
obtaining an output of the machine learning model by providing the prompt input to the machine learning model, the output of the machine learning model indicating whether the interaction information comprises or depends on the first type of information indicated by the persistent storage configuration;
in response to determining that the interaction information comprises information corresponding to the first type of information and the first type of information is not stored, writing the first type of information into a storage area corresponding to the first type;
in response to determining that the interaction information comprises information depending on the first type of information and the first type of information has been stored, reading the stored first type of information from the storage area corresponding to the first type; and determining, based on the stored or read first type of information, a response of the digital assistant to the user.

14. The non-transitory computer readable storage medium of claim 13, wherein the persistent storage configuration comprises a definition of one or more types of information to be stored for the digital assistant, the one or more type comprising the first type.

15. The non-transitory computer readable storage medium of claim 13, wherein the operations further comprise:

in response to determining that the first type of stored information is different from the first type of information included in the interaction information, updating the stored information of the first type with the information included in the interaction information.

16. The non-transitory computer readable storage medium of claim 13, wherein the operations further comprise:

in response to determining that the interaction information depends on the first type of information and that the first type of information is not stored, providing a prompt for information to the user, the prompt requesting that the user to provide the first type of information.

17. The non-transitory computer readable storage medium of claim 13, wherein the storage area corresponding to the first type comprises a storage area in a persistent storage device.

* * * * *